United States Patent [19]

Sambucetti

[11] 4,211,616

[45] Jul. 8, 1980

[54] ELECTROCHROMIC PRINTING SYSTEM

[75] Inventor: Carlos J. Sambucetti, Croton-on-Hudson, N.Y.

[73] Assignee: International Business Machines Corporation, Armonk, N.Y.

[21] Appl. No.: 42,177

[22] Filed: May 24, 1979

[51] Int. Cl.$^2$ ..................... G01D 15/06; G01D 15/34
[52] U.S. Cl. ......................................... 204/2; 252/62.2
[58] Field of Search ............... 204/2, 18 PC; 346/135, 346/165; 427/146, 150; 252/62.1 L, 62.2

[56] References Cited

U.S. PATENT DOCUMENTS

| | | | |
|---|---|---|---|
| 3,511,700 | 5/1970 | Miro | 204/2 |
| 3,655,527 | 4/1972 | Curran | 204/2 |
| 3,753,869 | 8/1973 | Ambrosia | 204/2 |
| 3,905,876 | 9/1975 | Yoshino | 204/2 |
| 3,951,757 | 4/1976 | Yoshino | 204/2 |
| 4,035,244 | 7/1977 | Inque | 396/165 |

*Primary Examiner*—T. M. Tufariello
*Attorney, Agent, or Firm*—Hansel L. McGee

[57] ABSTRACT

An improved electrolytic printing fluid is described. The printing fluid is comprised of an agent for the catalyzation of the electro-oxidation of a color forming agent therein. The fluid may include an agent which can form a clathrate complex with the color forming agent, as well as an agent which prevents discoloring of the paper when said fluid is coated on the same. The coated paper is subjected to an electrolytic printing method using non-consumable electrode.

18 Claims, No Drawings

ELECTROCHROMIC PRINTING SYSTEM

BACKGROUND OF THE INVENTION

1. Field of the Invention

The present invention relates to an improved electrolytic printing fluid and to a method of using the same. The method features the use of non-consumable electrodes.

2. Prior Art

In the electrolytic printing art there are at least two schemes for writing processes. In one such scheme, metallic ions from one of the electrodes are introduced into the printing sheet and they are either combined with colorless materials already present in the printing sheet in order to form colored complexes, or are precipitated as fine metallic particles. Exemplary of this scheme are those disclosed in U.S. Pat. Nos. 3,951,757 and 4,035,244.

In another scheme the electrodes are not consumed, the writing being accomplished by the electrolytic modification of materials already in the printing sheet. The scheme used the starch-iodine reaction to effect writing. Generally in this scheme, the electrolysis of potassium iodide or other iodide compound in the paper generates free iodine which reacts with the starch, also present in the paper, producing the widely known purple starch-iodide complex. The process of this scheme is fairly sensitive requiring moderately low current, e.g., $5 \times 10^{-3}$ amps to about $5.10^{-2}$ amps, to produce a sufficiently dense image. Exemplary scheme of this type are those disclosed in U.S. Pat. Nos. 3,905,876 and 3,655,527.

Belonging to the latter class, it is also a dry electrolytic printing in which a very special paper is used consisting of one or two metallized layers.

Inherent in the last scheme are the disadvantages of requiring expensive paper requiring special layers of materials and the requirement of voltages that exceed 100 volts to print. See U.S. Pat. No. 3,511,700. Additionally, the consumable scheme suffers the additional disadvantages of having the stylus consumed in the process. This requires complicated printhead mechanisms with feeding devices to keep the stylus working. The non-consumable scheme suffers the further disadvantage of the lack of permanency due to fading of the printed works and the discoloration of the paper on storage.

OBJECTS OF THE INVENTION

It is an object of the present invention to provide an improved printing fluid for use in electrolytic printing.

Another object of the invention is to provide an improved printing fluid for use in a non-consumable stylus electrolytic printing process and yet another object of the invention is to provide an improved printing fluid for use in a electrolytic process in which plain paper can be used.

DESCRIPTION OF THE PREFERRED EMBODIMENTS

The objects of the invention are accomplished in general by providing a printing fluid comprising a colorless soluble iodide compound, which upon oxidation will generate colored indicia, a radical forming oxidizing agent, such as a colorless soluble bromide compound to initiate the oxidation of iodide compound to free iodine, and a complexing agent to form an insoluble material with said free iodine.

It is known in the electrolytic printing art to use iodide solutions for the formation of colored indicia. In the prior art, iodide solutions are directly electro-oxidized to iodine. As indicated above, these schemes suffered the disadvantages of fading of the colored indicia, slowness of reaction and paper discoloration. In order to overcome the discoloration disability, the prior art reduced the concentration of the iodide to less than 1% iodide. In doing so, the indicia faded and the reaction was slowed considerably. On the other hand, when the iodide concentration exceeded 1% the problem of discoloration reappeared.

These problems are overcome by the present invention by using an electrocatalytic reagent to control the oxidation of the iodide to iodine. It has been discovered here that using an electrocatalytic reaction instead of direct electro-oxidation of iodide extremely small concentrations of the iodine can be used without the subsequent fading problem of the prior art. Additionally the discoloration problem is overcome and the speed of reaction is faster than that evidenced in the prior art.

SUMMARY OF THE INVENTION

Preferred embodiments of the invention may be described as a printing fluid comprising a bromide compound for catalyzing the electro-oxidation of an iodide, the color-forming agent therein, a compound which forms a clathrate complex with iodine and a fluoride compound for preventing discoloration of a fluid coated paper.

In the practice of the invention a bromide is added to an iodide containing printing fluid to serve as an electro-oxidation catalyst. The bromide can be chosen from any of the more commonplace bromide compounds, such as ammonium bromide, potassium bromide, sodium bromide and the like. The bromide is present in the amount so as to provide a $BR^-/I'$, ratio in the range of from 5 to 1 mole, to about 50 to 1 mole. It is believed that the following reaction is accomplished when a current pulse is passed to a substrate having the printing fluid of this invention thereon;

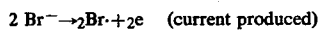

$2 Br^- \rightarrow 2Br \cdot + 2e$ (current produced)

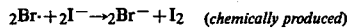

$2Br \cdot + 2I^- \rightarrow 2Br^- + I_2$ (chemically produced)

The above reaction occurs at the positive electrode or styli, while at negative styli the cation is discharged. In preferred embodiments the optimum ratio of $Br^-/I^-$ is from about 15 to 40:1 in molar concentrations.

To increase the stability of the printed indicia there is included a substance which forms a clathrate inclusion complex or an insoluble compound with iodine. This substance can be chosen from the following compounds: urea, amylose, quinine, polyaryl phosphates and borates, such as sodium phenyl borate and biphenyl phosphate. The substance can be present in amounts of from about 0.2 to 5% by weight of solution.

The color forming agent in the printing fluid is the iodide which is oxidized to iodine as indicated above. The iodide can be any of the well known iodide compounds such as KI, NaI, $NH_4I$ and the like. Preferably, tetraalkyl ammonium iodide compounds are used. It has been found that when these compounds are used there is less "dragging" or "bleeding" of the printed characters. Trimethyl phenyl ammonium iodide, acetyl choline iodide and propionyl choline iodide are exemplary of these preferred compositions. It is believed that these compounds increase the microviscosity around the paper fibers.

The iodide can be present in the printing fluid in amounts of from about 0.2 to about 5% by weight of solution.

In those cases in which it is desirous to coat the paper prior to printing and to store the same, it is necessary to assure the lack of discoloration. As indicated above, this problem is largely overcome by the use of extremely low iodide concentrations. However, even at these low concentrations discoloration can occur because of actinic radiation.

To overcome this further problem of discoloration a fluoride or other complexing compounds can be added to the printing fluid. For example, compounds such as KF, NaF, NH$_4$F and ethylene diamine tetraacetic acid can be used. These compounds are present in the fluid in amounts of from about 1 to about 10% by weight of solution.

Additionally, to enhance the color of the printed indicia, a dye can also be added to the fluid composition. For example, the following dyes can be used: leuco methylene blue and derivatives, leuco crystal violet and 4,4' methylene bis, N-N dimethyl-aniline, all of which tend to form addition compounds with iodine and thereby stabilize the printed indicia. Suitable leuco methylene blue derivatives contemplated by this invention include p-sulfonic-benzoyl leuco methylene blue, p-carboxy-benzoyl leuco methylene blue, benzoyl leuco-N,N' p-benzene sulfonic (symmetrical) methylene blue and benzoyl leuco N,N'-p-naptholsulfonic (symmetrical) methylene blue. The pH of the fluid is adjusted to a value of about 6.5 to about 8.5 by the addition of phosphate buffer.

The above compounds are dissolved in water. Alcohol may be added to the aqueous solutions to increase the volatility of the fluid. The prepared printing fluid can be applied to any ordinary paper by spraying or other coating technique. It can be applied just prior to printing or it can be applied to the paper to be used at some future time.

Printing can be provided by conventional electrolytic printhead. Particularly, non-consumable electrodes can be used. A voltage of from about 10 volts to about 30 volts is all that is required when the printing fluid of this invention is used. The working pH of the fluid is between 6.5 to 8.5.

The following examples are provided to further illustrate the invention and are not considered to limit the invention in any manner.

EXAMPLE 1

A printing fluid is prepared by dissolving 18 grams of ammonium bromide, 1.5 grams of trimethyl phenyl ammonium iodide, 10 grams of potassium fluoride in 100 ml of water to which is added 5 ml of ethanol. The so prepared fluid has a Br/I ratio of 32 molar. The fluid is then sprayed on ordinary paper.

The treated paper is subjected to electrolytic printing apparatus. Indicia is then electrolytically printed on the paper by applying in a predetermined voltage pattern of about 20 volts thereacross. The printed indicia was blue-black.

EXAMPLE 2

A printing fluid is prepared by dissolving 9 grams of ammonium or potassium bromide, 0.5 grams of potassium iodide, 2 grams of potassium fluoride and 1.4 grams of potassium dihydrogen phosphate in 100 ml of water. The fluid is adjusted to a pH of about 8 by the addition of NaOH. It is then filtered and sprayed on ordinary paper as in Example 1. Indicia is printed on the treated paper under the same conditions as in Example 1. The printed indicia was dark blue.

EXAMPLE 3

A printing fluid is prepared by dissolving 4 grams of ammonium bromide, 5 grams of potassium bromide, 0.3 grams of potassium iodide, 2 grams of potassium fluoride and 2 grams of urea in 100 ml of water. The fluid is adjusted to a pH of about 8 by the addition of NaOH. The fluid is coated on ordinary paper which is treated as in Example 1. The printed indicia was sepia in color.

EXAMPLE 4

The printing fluid is prepared according to Example 3 except that the urea is substituted for by an amylose complex and potassium fluoride is substituted by EDTA (ethylenediamine tetraacetic acid). The amylose urea mixture because of its insolubility in water, is prepared by dissolving 1 gram of amylose in 4 grams of molten urea. The mixture is cooled and solidified. The solidified mixture is then grounded and 2 grams are used. The printed indicia was purple.

EXAMPLE 5

A printing fluid is prepared by dissolving 10 grams of potassium bromide, 1 gram of trimethyl ammonium iodide, 1 gram of the sodium salt of ethylenediamine tetraacetic acid, 1 gram of quinine hydrochloride and 0.5 grams of ammonium nitrate in 100 ml of water. The fluid is adjusted to a pH of about 8 by the addition of sodium hydroxide. In this example ammonium nitrate is used as a curing and oxidizing agent of impurities in the paper and intensifying the darkness of the indicia.

The prepared fluid was coated in ordinary paper which is treated as in the previous examples. The printed indicia was very black in color.

The foregoing compositions of the present invention have the advantages of being water based. They are nontoxic, can be used on ordinary paper and printing can be effected at high speeds, e.g., 20 $\mu$sec/dot.

Having thus described my invention, what I claim as new, and desire to secure by Letters Patent is:

1. An aqueous electrochromic printing fluid comprising
    (a) an iodide compound as a color forming agent;
    (b) a bromide compound to catalyze an electro-oxidation of said iodide compound;
    (c) a compound which forms a clathrate complex with iodine formed from the electro-oxidation of said iodide compound; and
    (d) a discoloration inhibiting compound.

2. An electrochromic printing fluid according to claim 1 wherein said iodide compound is selected from the group consisting of KI, NaI, NH$_4$I, trimethyl phenyl ammonium iodide, acetyl choline iodide and propionyl choline iodide.

3. An electrochromic printing fluid according to claim 2 wherein said bromide compound is selected from the group consisting of NH$_4$Br, KBr, and NaBr.

4. An electrochromic printing fluid according to claim 3 wherein said clathrate complex forming agent is selected from the group consisting of urea, amylose, quinine, sodium phenyl, borate and biphenyl phosphate.

5. An electrochromic printing fluid according to claim 4 wherein said discoloration inhibiting compound is selected from the group consisting of KF, NaF, $NH_4F$, and ethylenediamine tetraacetic acid salts.

6. An electrochromic printing fluid according to claim 5 wherein there is a molar ratio of $Br^-/I^-$ in the range of from about 5 to 1 to about 50 to 1.

7. An electrochromic printing fluid according to claim 6 wherein said clathrate complex forming agent is present in the amount of about 0.2 to about 5 grs % by weight of solution.

8. An electrochromic printing fluid according to claim 7 wherein said discoloration inhibiting compound is present in the amount of about 1 to about 10 grs % by weight of solution.

9. An electrochromic printing fluid according to claim 7 wherein there is added a color enhancing agent selected from the group consisting of leuco methylene blue, and derivatives crystal violet and 4,4' methylene bis N-N' dimethylaniline.

10. A method of electrochromic printing including the steps of:
   (a) applying onto a substrate an electrochromic printing fluid comprising
      (1) an iodide compound as a color forming agent
      (2) a bromide compound to catalyze an electro-oxidation of said iodide compound
      (3) a compound which forms a clathrate complex with iodine formed from the electro-oxidation of said iodide compound; and
      (4) a discoloration inhibiting compound; and thereafter
   (b) applying an electrical field in a predetermined pattern across said substrate.

11. A method of electrochromic printing according to claim 10 wherein said iodide is selected from KI, NaI, $NH_4I$, trimethyl phenyl ammonium iodide, acetylcholine iodide and propionyl choline iodide.

12. A method of electrochromic printing according to claim 11 wherein said bromide compound is selected from the group consisting of $NH_4Br$, KBr and NaBr.

13. A method of electrochromic printing according to claim 12 wherein said clathrate complex forming agent is selected from the group consisting of urea, amylose, quinine, sodium phenyl borate and biphenyl phosphate.

14. A method of electrochromic printing according to claim 13 wherein said discoloration inhibiting compound is selected from the group consisting of KF, NaF, $NH_4F$ and ethylenediamine tetraacetic acid salts.

15. A method of electrochromic printing according to claim 14 wherein there is a molar ratio of $Br^-/I^-$ in the range of from about 5 to 1 to about 50 to 1.

16. A method of electrochromic printing according to claim 15 wherein said clathrate complex forming agent is present in the amount of about 0.2 to about 5% by weight of solution.

17. A method of electrochromic printing according to claim 16 wherein said discoloration inhibiting compound is present in the amount of about 1 to about 10% by weight of solution.

18. A method of electrochromic printing according to claim 17 wherein there is added a color enhancing agent selected from the group consisting of leuco methylene blue and derivatives, leuco crystal violet and 4,4' methylene bis, N-N' dimethylaniline.

* * * * *